Patented Jan. 3, 1939

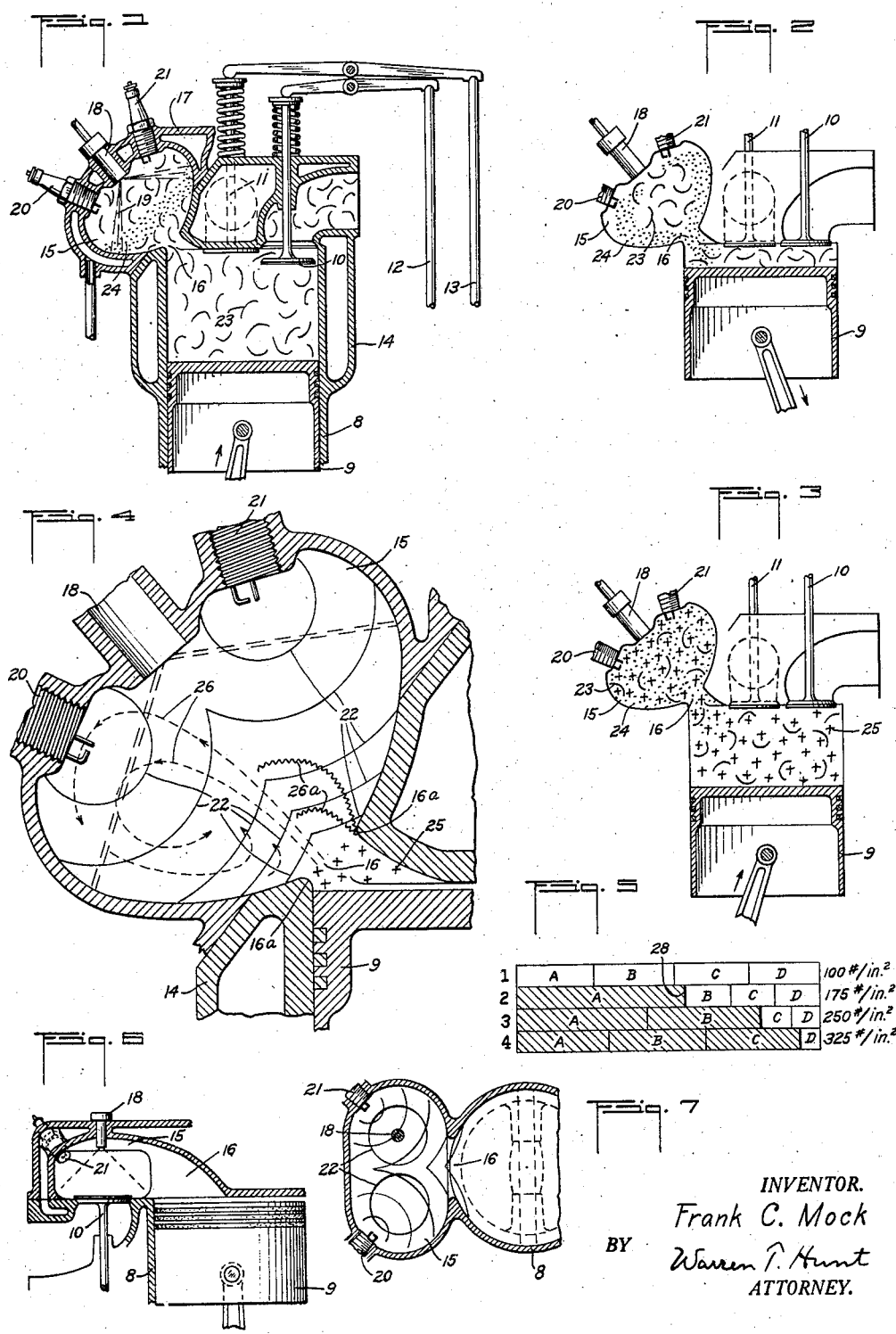

2,142,280

UNITED STATES PATENT OFFICE 2,142,280

INTERNAL COMBUSTION ENGINE

Frank C. Mock, Montclair, N. J., assignor to Eclipse Aviation Corporation, East Orange, N. J., a corporation of New Jersey Application June 29, 1933, Serial No. 678,277

2 Claims. (Cl. 123—32)

This invention relates to internal combustion engines and more particularly to engines of the liquid fuel injection type.

In engines of the above type heretofore utilized, considerable difficulty has been encountered in securing relatively rapid and complete vaporization of the injected fuel and efficient combustion of the resultant fuel mixture without obtaining detonation and its accompanying disadvantages, especially in that type of engine where relatively high compression ratios are desired to be attained.

One of the objects of the present invention is to provide a novel internal combustion engine so constructed as to avoid the above mentioned difficulties.

Another object of the invention is to provide in an internal combustion engine, a novel method and means for introducing the fuel therein whereby a more rapid and complete vaporization of the fuel will occur, and wherein the combustion thereof will be effected in such a manner that detonation and rough running of the engine will be avoided.

Still another object is to provide in an internal combustion engine of the above character, a novel construction whereby the combustible mixture is formed and initially ignited without the engine cylinder, the burning of the mixture being accompanied by a flame having a substantially spherical wave front which proceeds in such a manner as to encounter a relatively non-homogeneous mixture of fuel vapor and air prior to reaching the engine cylinder, thereby materially decreasing the tendency for spontaneous ignition of any portion of the mixture, which might cause detonation.

A further object is to provide in an engine of the above type, a novel combustion chamber construction wherein the fuel is initially conducted and wherein ignition of the fuel charge occurs in such a manner as to avoid the possibility of the flame front of the burning charge trapping explosive mixture against a wall where such mixture might be detonated by compression.

A further object is to provide a novel method of timing and directing the injection of fuel into an engine of the above character whereby a more complete vaporization of the fuel will be obtained and ignition and combustion of the fuel may be effected in a highly efficient manner and without obtaining detonation.

A still further object is to provide a novel internal combustion engine having a relatively high compression ratio which may be operated without detonation and yielding a materially higher fuel efficiency with relatively lower stresses and weight than has heretofore been obtained.

Other objects and novel features of the invention will appear more fully hereinafter from the following detailed description when taken in connection with the accompanying drawing, wherein the invention is illustrated as being embodied in several forms. It is to be expressly understood, however, that the drawing is for purposes of illustration only and is not designed as a definition of the invention, reference being had for this purpose to the appended claims.

In the drawing:

Fig. 1 is a vertical section of an internal combustion engine cylinder construction embodying the present invention;

Fig. 2 is a diagrammatic view of the parts shown in Fig. 1 and illustrating the condition of the fuel charge during the working stroke with both inlet and exhaust valves closed;

Fig. 3 is a diagrammatic view similar to Fig. 2 showing the condition of the fuel charge during the compression stroke;

Fig. 4 is an enlarged sectional view of the combustion chamber showing the condition of the fuel charge shortly after ignition;

Fig. 5 illustrates an explanatory chart of pressures developed after ignition of various portions of a fuel charge;

Fig. 6 is a partial sectional view of the invention applied to an L-head engine; and Fig. 7 is a horizontal partial sectional view of the parts shown in Fig. 6.

In order to understand at the outset, one of the principles of operation of an internal combustion engine, and with which the present invention is associated, reference will be had to the illustrative chart of Fig. 5 wherein it may be assumed that any one particular charge of combustible mixture is divided into four equal portions, A, B, C and D, line 1. The latter represents these four portions of the charge as being of equal volume, prior to ignition and after having been compressed to a pressure of 100 lbs. per square inch. After portion A has been ignited and burned, as indicated at 28 and by the shaded area A of line 2, the pressure rises to 175 lbs. per square inch and the volume of portion A has increased while the combined volume of portions B, C and D has decreased. Line 3 indicates the relative volumes of the various portions of the charge after portion B has also been ignited and burned, it being noted that the pressure has risen to 250 lbs. per square inch, while line 4 shows the condition of the charge after portion C has been ignited and burned. It will be appreciated from a consideration of the latter, that the unburned portion D is of relatively small volume and under a relatively high pressure, 325 lbs. per square inch, as indicated. From the latter, it will also be appreciated that spontaneous combustion of the last portion D under such high pressure may produce detonation, it having been determined that the spontaneous combustion of portion D under high pressure, and especially if trapped against a wall of the combustion chamber, will effect a rapid persisting reciprocating movement of flame throughout the combustion space, generating waves of high pressure and luminosity which initiates detonation both directly and secondarily by heating the walls of the combustion chamber to a relatively high temperature.

In eliminating the above described undesirable condition, the present invention embodies, among other features, two principles, namely that upon burning of fuel, the flame propagation of the burning mixture proceeds from the point of ignition outwardly with a substantially spherical wave front; and that combustion and spontaneous ignition of a lean or poorly diffused mixture of fuel vapor and air is slower and more difficult than with a finely divided homogeneous mixture.

Referring to Fig. 1, an internal combustion engine constructed in accordance with the present invention is illustrated therein as being constituted by a cylinder 8 having a piston 9 reciprocatingly mounted therein. Exhaust gas and air inlet valves 10 and 11 respectively are provided in the cylinder head and suitable actuating means 12 and 13 are employed for operating said valves, as well understood in the art. A jacket 14 preferably surrounds the cylinder 8 and a suitable cooling medium may be circulated therein for the purpose of cooling the walls of the cylinder.

The present invention, as heretofore pointed out, is particularly concerned with a method and means for vaporizing and igniting the fuel charge for the purpose of eliminating detonation and to this end there is provided a suitably shaped combustion chamber 15 secured to but offset from said cylinder, and communicating with the latter through a restricted opening 16. In the form shown, the chamber 15 is heart-shaped, but it will be understood that any suitable form may be employed, it being necessary only that the form be such as to prevent the trapping of a portion of the charge against a wall of the chamber by the advancing spherical flame wave front. Preferably, the chamber is provided with means whereby its walls may be maintained at a higher temperature than is necessary for the piston travelled walls of the cylinder. For example, a jacket 17 may be provided in which a suitable liquid, such as triethyl glycol may be circulated. It will be noted from the latter that the walls of the chamber 15 are of such contour that the advancing flame front always encounters such walls obliquely by which arrangement the possibility of trapping explosive mixture against a wall of the combustion chamber, which might cause detonation if spontaneously ignited, is avoided.

In operation of that form of the invention illustrated in Figs. 1 to 4, and referring to Fig. 1, it will be apparent that fuel may be injected into chamber 15 through the nozzle 18 during the late exhaust or early intake strokes of the piston, the requirement being that the fuel must not enter too greatly into the piston displacement chamber. In certain instances, it may also be desirable to inject a portion of the fuel charge insufficient of itself to propagate combustion, early in the cycle, as for example during the intake stroke, and then inject the remainder of the fuel charge just prior to ignition. Such a procedure would favor more complete evaporation and mixture of the fuel and air than might otherwise occur if all of the fuel were injected just prior to ignition.

Since injection of fuel under any of the above circumstances takes place in a chamber relatively isolated with respect to the engine cylinder, it will be appreciated that a greater interval of time is permitted for vaporizing the fuel, thus effecting a greater degree of vaporization than has heretofore been obtained, and especially is this true when the fuel is injected during the late exhaust or early intake strokes of the piston. Under the latter condition, a mixture, vaporized to a relatively high degree, is obtained prior to the occurrence of ignition.

Referring again to Figs. 1 to 4 and considering that injection of fuel is occurring during the exhaust stroke, the combustion chamber will be filled with hot exhaust gases, as indicated by short curved lines 23, the heat of which will assist in vaporizing the injected fuel indicated by the dots 24. The relative positions of the fuel vapor 24 and the exhaust gases 23 in the combustion chamber 15 after completion of the exhaust stroke and just prior to opening of the intake valve is illustrated in Fig. 2, while Fig. 3 illustrates, during the compression stroke, the intimate commingling of the fuel vapor, a slight amount of exhaust gases, together with air, indicated by the crosses 25, which was drawn into the cylinder during the suction stroke.

Fig. 4 illustrates diagrammatically the conditions in the combustion chamber after the compression stroke, during which air alone has been forced into the heart-shaped chamber 15 to effect an irregular vortex of fuel vapor in each half of the chamber, as indicated by the lines 26. Such turbulence is materially aided by providing the opening 16 communicating the chamber 15 with the cylinder 8 with relatively sharp entrance walls 16a. It will also be noted, as heretofore pointed out, that when ignition occurs the spherical wave front 22 of the flame due to the burning of the combustible mixture will be propagated from each of the ignition devices 20 and 21 toward the opening 16 somewhat modified by the mass motion existing in the gaseous charge. It is to be particularly noted that initially the flame front encounters a well vaporized combustible mixture and an efficient burning of the fuel is effected. However, as the flame fronts approach the opening 16, a less combustible mixture is encountered due to the passage of air alone, 25, into said chamber during the final part of the compression stroke, Fig. 3, the air being probably in the form of jets 26a adjacent the opening 16. Thus the flame fronts lastly encounter a mixture largely composed of air, just prior to entry into the cylinder 8 during the working stroke, which mixture is relatively non-combustible, and this feature effects a substantial elimination of the possibility of detonation, as heretofore pointed out. As shown in this figure, fuel injection may occur during the compression stroke.

A modified form of the invention enabling the utilization of the principles herein described with an L-head engine is disclosed in Figs. 6 and 7, wherein it will be noted that fuel injection occurs in an offset chamber 15 through the nozzle 18 directly on to exhaust valve 10. The ignition devices 20 and 21 as heretofore, are so located in the chamber that the direction of propagation of the spherical wave fronts of the burning mixture will be towards the opening 16 communicating the chamber with the cylinder 8 as indicated at 22, Fig. 7.

From the above, it will be appreciated that there is provided by the present invention, a novel internal combustion engine which is so constructed and arranged as to enable high compression ratios to be utilized and wherein unusually high fuel efficiencies may be realized. The provision of the combustion chamber relatively remote from the engine cylinder and the manner in which fuel is injected therein results in a more complete vaporization of the fuel than is possible in engines of the compression ignition or Diesel types.

The location of the ignition devices employed in connection with the combustion chamber is such that the wave fronts of the burning gases are directed towards the opening communicating said chamber with the engine cylinder and the combustion flame encounters a relatively lean mixture of fuel and air just prior to entry of the flame fronts into the last portion of the enclosed space in said chamber, this arrangement avoiding the possibility of any spontaneous combustion of the portion of the charge under high pressure, which might otherwise cause detonation and high pressure high temperature waves.

While several embodiments of the invention have been disclosed and described herein, it is to be understood that the same is not limited thereto but may be embodied in other forms as well understood by those skilled in the art, without departing from the spirit of the invention. Reference will therefore be had to the appended claims for a definition of the limits of the invention.

What is claimed is:

1. In an internal combustion engine having a cylinder and a piston, a combustion chamber of heart-shaped form offset from said cylinder, said chamber and cylinder communicating through a restricted opening positioned between the cylinder and the apex of said heart shaped chamber, fuel injection means in said chamber positioned in the wall of said chamber opposite to said opening, said fuel injecting means being arranged to direct fuel into said chamber, and ignition means disposed upon each side of said fuel injecting means and arranged adjacent thereto.

2. In an internal combustion engine having a cylinder and a piston reciprocating therein, a combustion chamber communicating with said cylinder through a restricted opening, said chamber being of heart-shaped form and being offset from said cylinder, fuel injecting means remote from said opening and positioned in the wall of said chamber opposite to said opening, said fuel injecting means being arranged to direct fuel into said chamber, and ignition means symmetrically disposed on each side of said fuel injecting means and arranged adjacent to said injecting means to direct the spherical wave front of the flame due to ignition of the fuel towards said opening.

FRANK C. MOCK.